US006871465B2

United States Patent
LaBruzza

(10) Patent No.: US 6,871,465 B2
(45) Date of Patent: Mar. 29, 2005

(54) MODULAR CONNECTION SYSTEM

(76) Inventor: Mathew G. LaBruzza, 11258 Rising Ridge Ave., Las Vegas, NV (US) 89135

(*) Notice: Subject to any disclaimer, the term of this patent is extended or adjusted under 35 U.S.C. 154(b) by 0 days.

(21) Appl. No.: 10/369,831

(22) Filed: Feb. 18, 2003

(65) Prior Publication Data
US 2003/0154675 A1 Aug. 21, 2003

Related U.S. Application Data
(60) Provisional application No. 60/358,426, filed on Feb. 19, 2002.

(51) Int. Cl.[7] ................................................ E04B 2/00
(52) U.S. Cl. ................... 52/582.1; 52/582.2; 52/585.1; 52/586.2; 52/36.1
(58) Field of Search ........................... 52/582.1, 36.1, 52/582.2, 586.2, 585.1

(56) References Cited
U.S. PATENT DOCUMENTS

| | | | | |
|---|---|---|---|---|
| 5,483,778 A | * | 1/1996 | Scrivener | 52/579 |
| 5,502,938 A | * | 4/1996 | Backer | 52/281 |
| 5,606,836 A | * | 3/1997 | Insalaco et al. | 52/582.1 |
| 5,743,056 A | * | 4/1998 | Balla-Goddard et al. | 52/309.11 |
| 5,749,197 A | * | 5/1998 | Jolly | 52/584.1 |
| 5,890,326 A | * | 4/1999 | Gallant et al. | 52/36.1 |
| 5,970,675 A | * | 10/1999 | Schray | 52/582.1 |
| 6,018,920 A | * | 2/2000 | Fancher | 52/582.2 |
| 6,298,619 B1 | * | 10/2001 | Davie | 52/293.3 |
| 6,389,773 B1 | * | 5/2002 | Reuter et al. | 52/582.2 |
| 6,527,335 B1 | * | 3/2003 | Yurgevich | 296/186.1 |
| 2002/0170259 A1 | * | 11/2002 | Ferris | 52/596 |

* cited by examiner

Primary Examiner—Peter M. Cuomo
Assistant Examiner—Erika Garrett

(57) ABSTRACT

A modular system includes a first panel having a first channel and a second panel having a second channel. A first coupler is mounted in the first channel, and a second coupler is mounted in the second channel. Each coupler includes a middle portion extending from the base and having an edge rounded at least locally to a thickened end of the edge. The middle portion has a length extending beyond the first channel in which the coupler is mounted and into the second channel when the first panel is abutted with the second panel. The couplers are mounted in opposing fashion to cause interference among the thickened ends when the panels are abutted.

9 Claims, 6 Drawing Sheets

MODULAR CONNECTION SYSTEM

PRIORITY CLAIM

Priority is hereby claimed to the United States provisional application for patent entitled MODULAR CONNECTION SYSTEM, having application Ser. No. 60/358,426, filed on Feb. 19, 2002.

FIELD

The invention relates to couplers, and, more particularly, to couplers for modular exhibit systems.

BACKGROUND

Modular exhibit systems are produced and marketed for the exhibit industry to be used at tradeshows, conferences and expositions. Exhibit types may be classified into one of three categories. These categories are Portable, Modular and Custom. Modular exhibit types include exhibit components engineered for structural stability and components engineered for lightweight simplicity.

Most lightweight modular panel systems feature primary connecting mechanisms concealed within the edges of the systems components. Some of these connecting mechanisms are fixed to the components while others are loose parts inserted during set up of the exhibit. The connectors prevents the components from coming apart. A connection is typically accomplished by creating interference between two adjacent connecting parts so that the connectors cannot pull out of channels attached to the edges of adjacent panels.

There are currently a number of primary connectors that create this type of interference. They are distinguished by the manner in which they create interference. These range from male/female couplers to designs where the opposing connectors are identical and create interference by passing next to each other and filling the channel which confines the connectors.

In large part the connector dictates how easy or difficult the exhibit setup will be, how versatile the components will be and how long the components will last. The connector determines how closely the components will fit against each other and how well they align with each other. The design of the connector also determines how well the connector will accommodate fluctuations within material dimensions. Also, the connector determines how stable or rigid the joint will be between adjoining components.

Exhibit components may also incorporate a secondary connecting mechanism that allows components to be stacked one on top of the other. This is commonly referred to as the stacking system. Stacking systems include pins that protrude downward to locate into holes, extrusion channel ends at the top edge of the components, and tongues that run along the bottom edge of the components which nest into a slot on the lower panel. The purpose of stacking systems is to allow components of the same dimensions to stack onto another.

A third important connecting mechanism is the mechanism by which the panels are held or locked into position. These mechanisms are referred to as panel locks. The design and function of panel locks is often closely tied to the connector solution. Panel locks range in the materials and mechanisms by which they create interference. Some require tools; all are designed to prevent connected components from sliding apart. Generally these locks are located near the top of a component so they can be engaged and disengaged manually. In addition to preventing components from sliding apart, locks hold components in place on uneven floors, maintaining the alignment of seams. Locks are also used to suspend components above the ground. Exhibit systems with locks are more stable and better able to bear weight, whether the weight be from exhibitor product or large or numerous display components stacked upon each other.

A number of US patents have been awarded for inventions relating to structural display systems and connecting systems for display components. These include U.S. Pat. Nos. 4,512,097 and 4,437,275 to Zeigler, U.S. Pat. No. 4,471,548 to Goudie, U.S. Pat. No. 4,712,336 to Backer, U.S. Pat. No. 4,610,560 to Miller, U.S. Pat. No. 4,823,858 to Perutz, and U.S. Pat. No. 34,738 to Brady. The Brady patent discloses a clip system, which permits the removable mounting of flat display panels. The clip system of that patent is relatively lightweight and inexpensive; the concealed connection permits the panels to be mounted to create a so-called full bleed display surface, which provides a continuous display surface, without gaps between adjacent panels.

The Brady system can be assembled without tools, and by one person with little skill. However, there are several problems with the system. When assembled together, these channels include, in cross section, an edge extrusion, which is generally hourglass-like. Each of the clips includes a pair of flexible, semi-circular tubes, which are designed to conform to the configuration of the hourglass channel to form a suitable mounting structure. This tube configuration is relatively difficult and therefore relatively expensive to mold, and because of the resiliency requirement they can become misshapen over time. This can result in the panels becoming misaligned or disconnected with respect to one another.

Also of note is U.S. Pat. No. 5,546,720 to LaBruzza. The LaBruzza patent represents an improvement over the Brady system in some important aspects but is disadvantaged in other aspects. The LaBruzza connectors are designed to engage the molded connector of the opposing channel, not the aluminum channel of the opposing component. This allows for a more simple extrusion design placing the full load of the connection on the molded connecting parts. Because of the shape and size of the LaBruzza invention, it is unnecessarily susceptible to problems caused by variances in material tolerances. Slight changes in the molded connectors size may be doubled, compounding the tolerance challenge. Additionally, because of the thickness and shape, the LaBruzza connector may be more prone to breakage.

A need therefor exists for a reliable, robust mechanism to connect components of exhibit systems, edge to edge, without tools or loose parts, where the connectors are concealed from view.

SUMMARY

A modular system includes a first panel having a first channel and a second panel having a second channel. A first coupler is mounted in the first channel, and a second coupler is mounted in the second channel. Each coupler includes a middle portion extending from the base and having an edge rounded at least locally to a thickened end of the edge. The middle portion has a length extending beyond the first channel in which the coupler is mounted and into the second channel when the first panel is abutted with the second panel. The couplers are mounted in opposing fashion to cause interference among the thickened ends when the panels are abutted.

The modular system may first include a first panel lock mounted at a top of the first channel and a second panel lock mounted in opposing fashion to the first at a top of the second channel. Each panel lock includes a base and a side coupled to the base by way of a hinge portion, the side including a notch sized to extend beyond the channel in which the panel lock is mounted and into a notch in the lip of an abutting channel.

FIGURES

The invention may be better understood with reference to the following figures in light of the accompanying description. The present invention, however, is limited only by the scope of the claims at the concluding portion of the specification.

DESCRIPTION

In the following description, references to "one embodiment" or "an embodiment" do not necessarily refer to the same embodiment, although they may. In the figures, like numbers refer to like elements.

Figure 1:
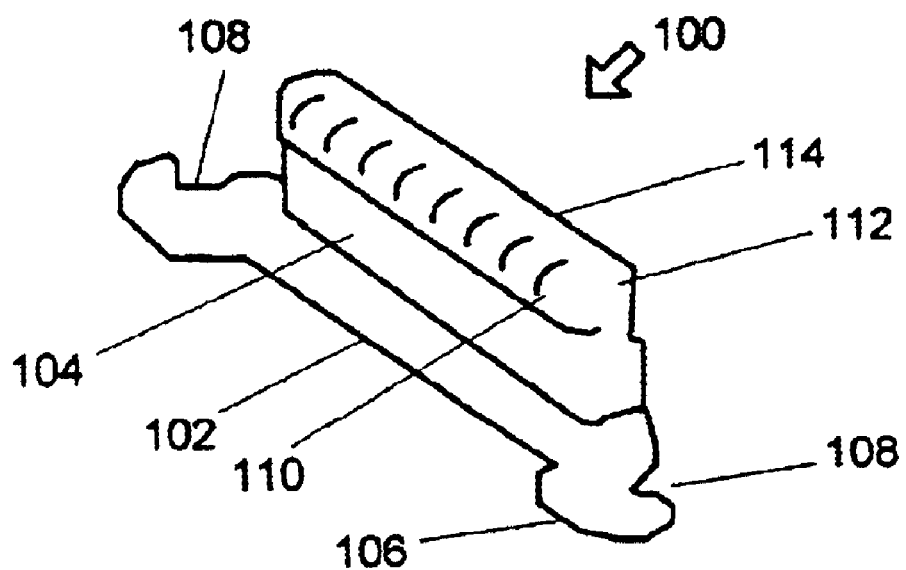
FIG. 1 is a perspective view of an embodiment of a coupler.

FIG. 1 is a perspective view of an embodiment 100 of a coupler. The coupler 100 can be molded as a single piece. The coupler comprises a base 102 including ears 106 forming mounting holes 108. A middle section 104 extends from the base 102. A rounded ridge 110 is formed at an edge of the middle section 104. The rounded ridge 110 may be formed along the entire length of the edge, substantial portions thereof, or local to the vicinity of the rounded and thickened end 112 of the edge 110. The middle section 104 may further comprise a flat area 114 (for example, along a section of the top of the middle portion) that can receive a printed label or other identifying marks.

Figure 2:
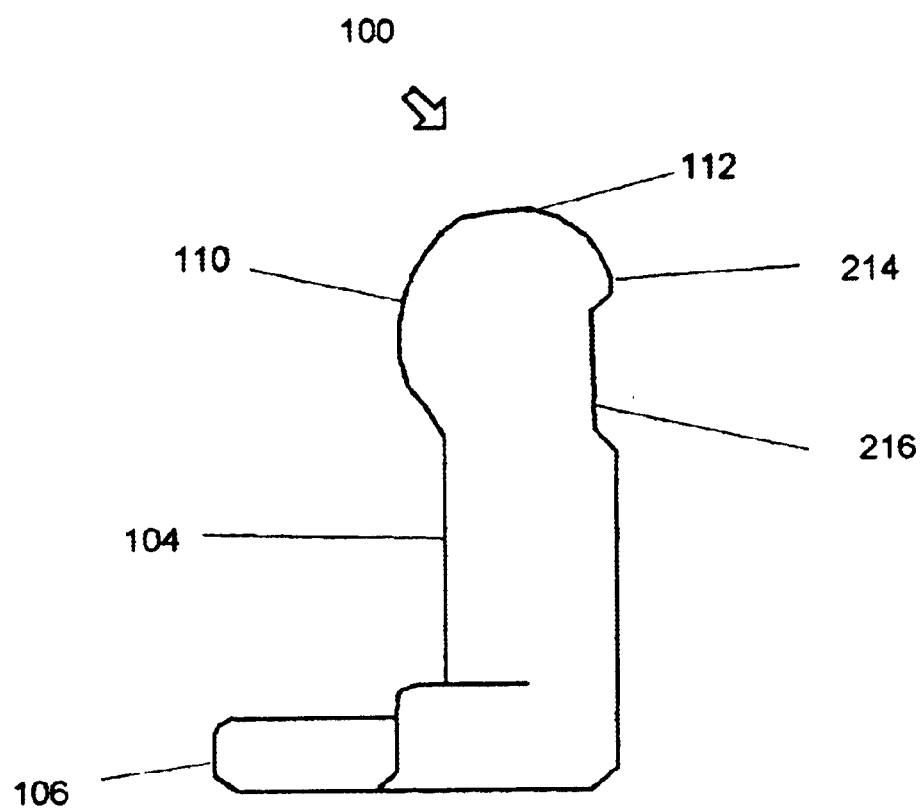
FIG. 2 is a side view of the coupler embodiment of FIG. 1.

FIG. 2 is a side view of the coupler 100 of FIG. 1. The rounded end 112 forms a lip 214. In one embodiment the lip 214 may extend for a substantial portion of or the entire length of the middle section 104. In another embodiment the extent of the lip 214 is local to the area of the end 112. A flat 216 is formed beneath the lip 214.

Figure 3:
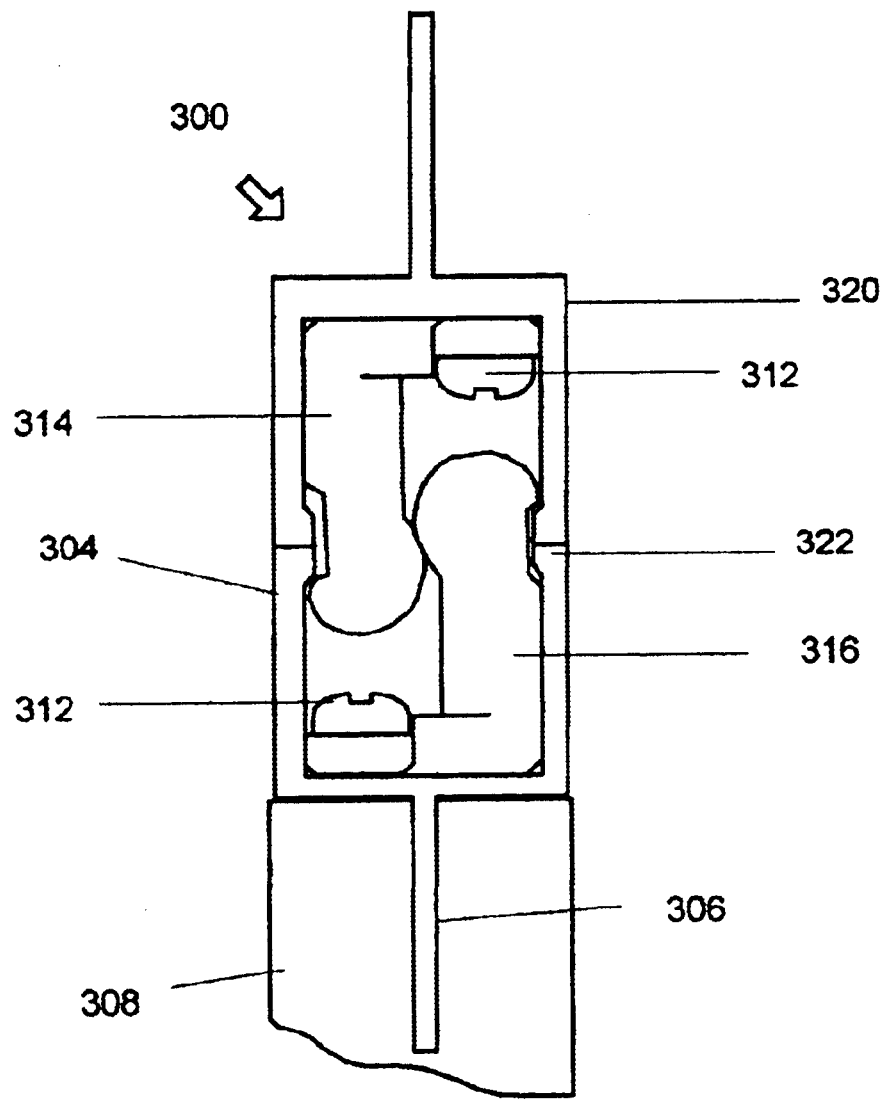
FIG. 3 is a cut-away view of an embodiment of couplers mounted in the channels of abutting panels.

FIG. 3 is a cut-away view of a system 300 for coupling two panels. Typically, two or more panels are coupled to form a corner or intersection of an exhibit. A panel 308 is joined to a channel 304 by a channel support element 306. The channel support element 306 may also comprise a separate piece that is not affixed to a panel, such as a corner connector, multidirectional connector, light box or window panel. A coupler 316 is mounted in the channel 304 by way of screws 312 through the mounting holes 108 in the ears 106. A second coupler 314 is mounted in a channel 320 of a second panel in a similar fashion. The end 112 of the coupler 314 protrudes into the opposing channel 320 where the rounded ridge 110 engages with the coupler 316. Likewise, the end 112 of the coupler 316 protrudes into the opposing channel 304 where the rounded ridge 110 engages with the coupler 314.

The coupler 316 is mounted in the channel 320 in opposing fashion to the coupler 314 mounted in the channel 304.

"Opposing fashion" refers to the manner of mounting the couplers as illustrated in FIG. 3, e.g. across from one another and on opposite sides of the channels.

Lips 322 at each end of the abutted channels form protrusions that extend beyond the lips 214 of the connectors 314, 316 and into the flats 216. The lips 214 of the couplers 314, 316 engage with the lips 322 of the channels to secure the abutment of the channels 304, 320. The rounded ridges 110 of the couplers 314, 316 also engage to further strengthen the abutment.

To couple the panels, the channels 304, 320 are brought into abutment and one channel is displaced vertically so that the end portions 112 of the couplers 314, 316 slide by one other, over one and the other, into the interlocking position illustrated in FIG. 3. When the couplers 314, 316 are slid even with each other, the ends 112 and particularly the ridges 110 interfere to prevent the channels from moving out of abutment. The couplers 314, 316 also bear against the backs and sides of the channels 304, 320 to resist lateral movement by the coupled panels.

Figure 4:
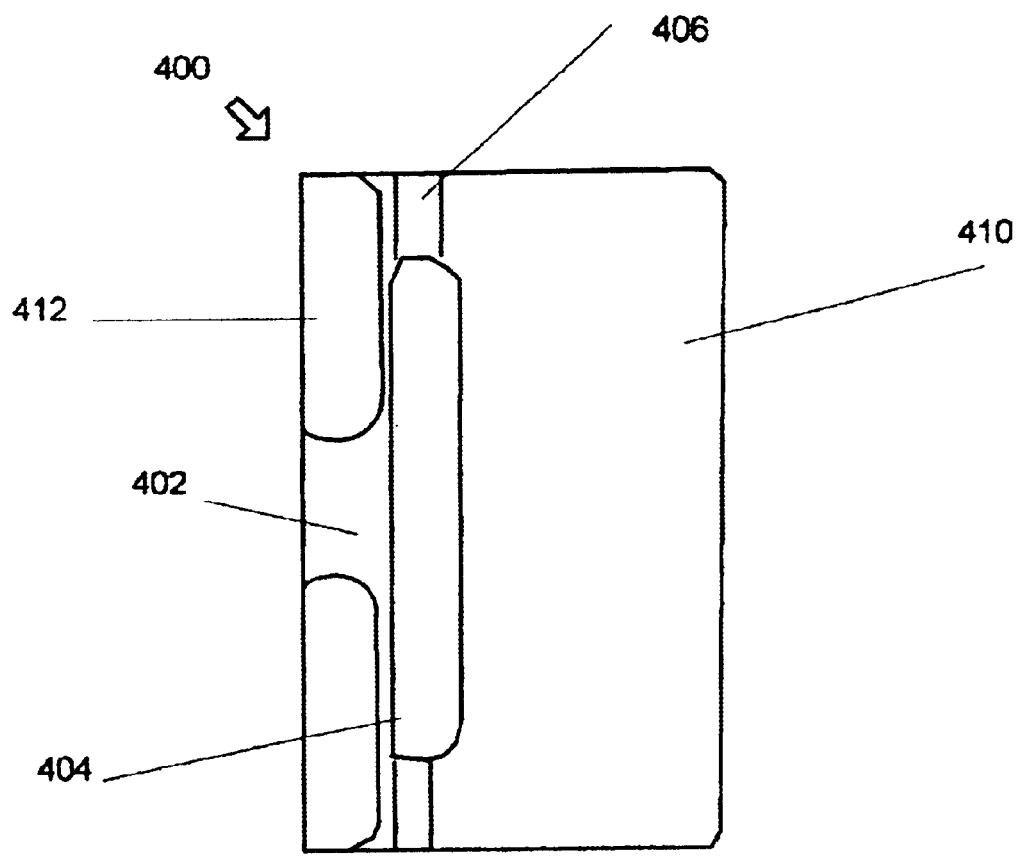
FIG. 4 is a front view of an embodiment of a panel lock.

FIG. 4 is a front view of an embodiment 400 of a panel lock. The panel lock 400 may be molded in a single piece. A base 412 includes a slot 402 to receive a mounting screw. A side 410 is coupled to the base 412 by a hinged portion 406. The hinged portion 406 including a cutout 404 enables the base 412 to flex in relation to the side 410.

Figure 5:
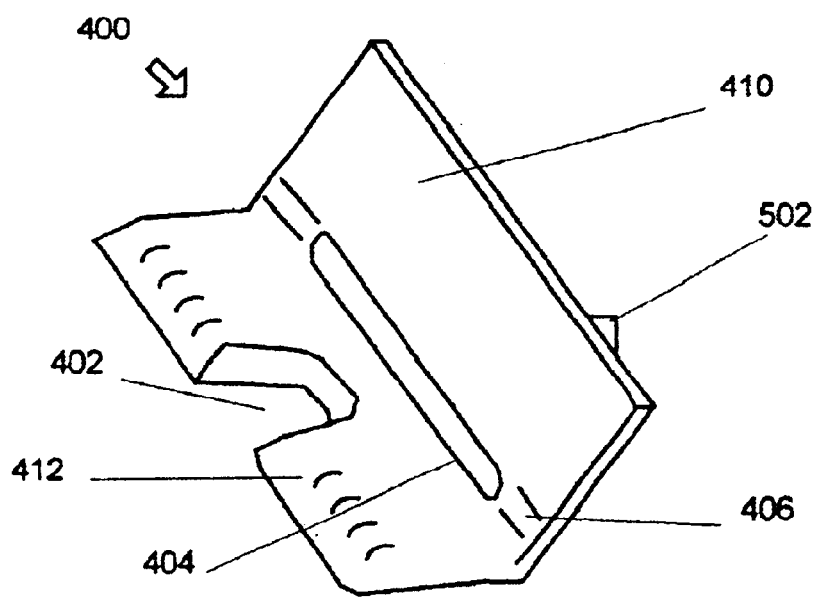
FIG. 5 is a perspective view of the panel lock of FIG. 4.

FIG. 5 is a perspective view of the panel lock 400 in a flexed position. A tab 502 protrudes from the side 410.

Figure 6:
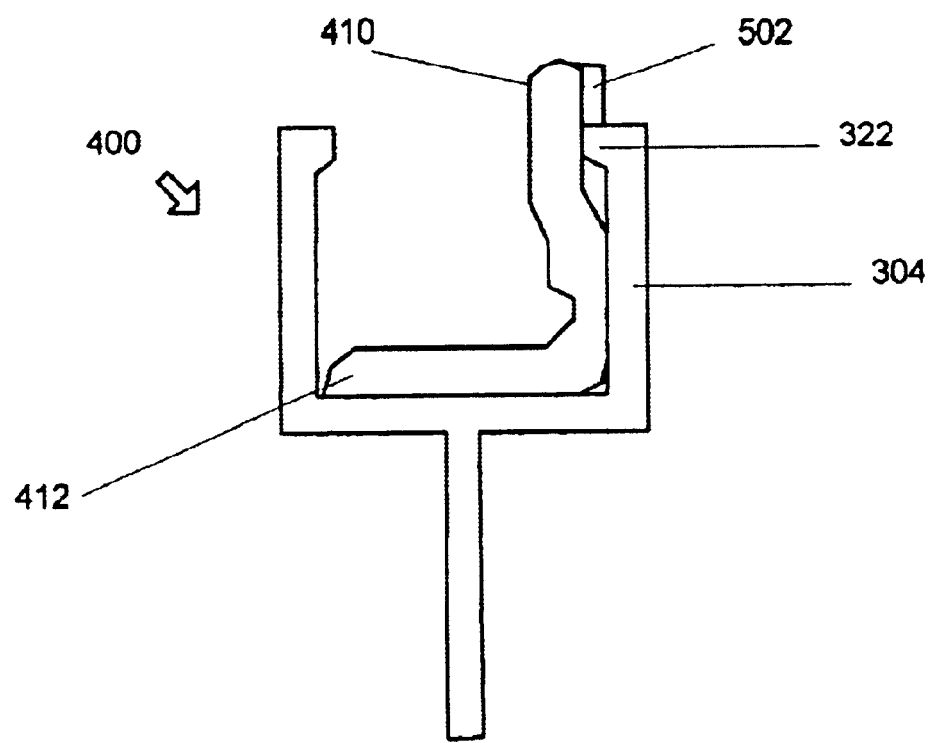
FIG. 6 is side view of the panel lock mounted in a channel of a panel.

FIG. 6 is a side view of the panel lock 400 mounted in a channel 304 of a panel. A second panel lock may be mounted in opposing fashion in an abutting channel. The panel lock 400 is mounted in the channel 304 near the top of the panel. The end 410 protrudes from the channel 304. To couple the panels, the channels 304, 320 are brought into abutment and one channel is displaced vertically so that the end portions 112 of the couplers 314, 316 slide by one other. As the couplers 314, 316 near the interlocking position, the tab 502 comes into contact with a top of the other channel 320. At the tops, the lips 322 of each channel 320 may be tapered so that the tab 502 slides along the taper until it engages with the notches in the lips 322.

The tab 502 engages notches in the lips 322 of the abutted channels. When the tab 502 is engaged with the notches in abutted channels the tab 502 prevents relative longitudinal displacement of the channels. The hinge portion 406 resists bending of the tab toward the center of the channel. The panels may be disengaged by applying pressure in opposing directions at the top of the panels, with a hand on the corner of each panel.

While certain features of the invention have been illustrated as described herein, many modifications, substitutions, changes and equivalents will now occur to those skilled in the art. It is, therefor, to be understood that the appended claims are intended to cover all such embodiments and changes as fall within the true spirit of the invention. In the claims, references to "a" or "an" element do not limit the claims to a single one of the element, but instead indicate one or more of the element, unless otherwise indicated.

What is claimed is:

1. A coupler for joining two panels, comprising:
   a base formed to mount to a channel of a panel;
   a middle portion extending from the base and having an edge rounded at least locally to a thickened end of the edge;
   the middle portion having a length to extend beyond a panel channel in which the coupler is mounted and into an abutting channel panel; and the middle portion and the rounded edge sized to cause interference with a similar connector mounted in opposing fashion in the abutting channel panel, the thickened end forming a lip to engage a lip of the abutting channel.

2. The coupler of claim 1 further comprising:

a flat formed below the lip of the thickened end, the flat formed to receive the lip of the abutting channel.

3. The coupler of claim 1, the middle portion further comprising a flat area along a top section of the middle portion.

4. A panel lock comprising:

a panel lock base;

a panel lock side coupled to the panel lock base by way of a flexible hinge portion, the hinge formed to flex in a direction dial urges the panel lock side perpendicular to the panel lock base and against a side of a channel when the panel lock base is against a bottom of the channel; and the panel lock side including a tab substantially perpendicular to the panel lock side.

5. The panel lock of claim 4 further comprising:

the panel lock base and panel lock side molded as a single piece.

6. The panel lock of claim 4 further comprising:

a cutout to facilitate flexing of the hinge portion.

7. A modular system comprising:

a first panel comprising a first channel;

a second panel comprising a second channel;

a first coupler mounted in the first channel, and a second coupler mounted in the second channel, each coupler comprising a middle portion extending from the base and having an edge rounded at least locally to a thickened end of the edge, the middle portion having a length to extend beyond the first channel in which the coupler is mounted and into the second channel when the first panel is abutted with the second panel;

the couplers mounted in opposing fashion to cause interference among the thickened ends when the panels are abutted.

8. The modular system of claim 7, each channel comprising an end having a notch and a lip, each lip tapered such that the tab of a panel lock may slide along the lip and snap into the notch.

9. The modular system of claim 7 further comprising:

a first panel lock mounted at a top of the first channel;

a second panel lock mounted in opposing fashion to the first at a top of the second channel;

each panel lock comprising a base;

a side coupled to the base by way of a hinge portion; and the side including a notch sized to extend beyond the channel in which the panel lock is mounted and into a notch in the lip of an abutting channel.

\* \* \* \* \*